United States Patent [19]
Kasuya et al.

[11] Patent Number: 5,436,906
[45] Date of Patent: Jul. 25, 1995

[54] RADIO TELECOMMUNICATION SYSTEM

[75] Inventors: Kisaburo Kasuya; Koichi Ito, both of Tokyo, Japan

[73] Assignee: Kabushiki Kaisha Toshiba, Kanagawa, Japan

[21] Appl. No.: 197,981

[22] Filed: Feb. 17, 1994

[30] Foreign Application Priority Data

Feb. 18, 1993 [JP] Japan .................................. 5-029105

[51] Int. Cl.$^6$ ........................................... H04B 7/212
[52] U.S. Cl. ..................... 370/95.3; 455/69; 375/285
[58] Field of Search ................. 371/5.5, 8.2; 455/34.2, 455/50.1, 52.1, 54.2, 69, 135; 370/24, 29, 95.1, 95.3; 375/51, 58, 38

[56] References Cited

U.S. PATENT DOCUMENTS 4,797,947  1/1989  Labedz .................................. 455/69
5,128,965  7/1992  Henriksson ........................... 375/38
5,323,446  6/1994  Kojima et al. ....................... 370/95.1

OTHER PUBLICATIONS

EIA/TIA Interim Standard—Cellular System Dual-Mode Mobil Station—Base Station Compatability Standard, Apr. 1992, pp. 59–66.

*Primary Examiner*—Benedict V. Safourek
*Attorney, Agent, or Firm*—Finnegan, Henderson, Farabow, Garrett & Dunner

[57] ABSTRACT

A radio telecommunication system has radio channels, each radio channel including a plurality of slots generated by time division. The system encompasses a plurality of areas having a base station which sends a first signal over a predetermined slot of the slots. If the signal quality of the first signal received by a portable apparatus is less than a criterion, at last on of the non-used slots is designated. The portable apparatus sends a second signal over the predetermined slot and the designated slot.

25 Claims, 17 Drawing Sheets

RADIO TELECOMMUNICATION SYSTEM

BACKGROUND OF THE INVENTION

1. Field of the Invention

The present invention generally relates to a radio telecommunication system for use in a radio telecommunication apparatus such as a portable telecommunication apparatus or a mobile telecommunication apparatus, and more particularly to a radio telecommunication system capable of maintaining the quality of signals received by the radio telecommunication apparatus.

2. Description of the Related Art

FIG. 18 shows a block diagram illustrating a digital radio telecommunication system. The system includes a control station CS connected to a landline network NW. The control station CS is further connected to plural base stations BS1, BS2, BS3 . . . over landlines CL1, CL2, CL3, . . . . Each base station has its own radio zone E1, E2, E3, . . . . Each portable apparatus communicates over radio channels with the base station in the radio zone in which it is located. Further each portable apparatus is connected to the landline network NW through the base station BS and the control station CS.

This system adopts a time division multiple access system, referred to as a TDMA system, as a communication system. In the TDMA system, each radio channel for a downward channel and for an upward channel includes a plurality of time frames. Each frame includes six time slots. In the event that a communication link is formed between the base station and the portable station, one time slot for the downward signal is assigned from the downward radio channel and one time slot for the upward signal is assigned from the upward radio channel. After that, the portable apparatus receives the downward signal in the assigned downward slot and sends the upward signal in the assigned upward slot. FIG. 18 shows downward slots in each downward channel and upward slots in each upward channel. Referring to FIG. 18, if the portable apparatus PS is assigned TS1 as a downward slot and assigned TS1' as an upward slot, the portable apparatus PS sends the intermittent upward signal to the base station BS during a period corresponding to the upward slot TS1'. Furthermore, the portable apparatus PS receives the downward signal during a period corresponding to a downward slot TS1. Thus, the upward slot TS1' is defined as a transmit slot and the downward slot TS1 is defined a receive slot. During a period corresponding to the downward slots TS2, TS3, TS4, TS5, the apparatus PS sends no signal to the base station BS. Therefore, the slots corresponding to the slots TS2, TS3, TS4, TS5 are defined as an idle slot. The above six slots TS1~TS6 repeat in every frame. However, if an obstacle such as a tall building is located between the base station and the portable apparatus, the quality of signals received by the portable apparatus becomes low. As a result, it is difficult for the user to listen to the decoded speech sound. This difficulty occurs when the signal is reflected from other buildings and the portable apparatus receives the reflected signal.

SUMMARY OF THE INVENTION

Accordingly, the present invention has been made in view of the above circumstances and has an object to provide a radio telecommunication system that compensates for deterioration of the quality of signals received by a radio telecommunication apparatus used in the radio telecommunication system.

Additional objects and advantages of the invention will be set forth in part in the description which follows and in part will be apparent from the description, or may be learned by practice of the invention. The objects and advantages of the invention may be realized and attained by means of the instrumentalities and combinations particularly pointed out in the written description and claims hereof as well as appended drawings.

To achieve these and other objects and advantages and in accordance with the purposes of the invention, there is provided a radio telecommunication system having radio channels, each radio channel including a plurality of slots generated by time division, wherein the system encompasses a plurality of areas each having a base station, each of which communicates a first signal, in a predetermined one of the slots, with a radio telecommunication apparatus, the system comprising: first receiving means for receiving the first signal; first checking means responsive to the first receiving means for checking a signal quality of the first received signal; comparing means responsive to the first checking means for comparing the signal quality to a criterion; designating means responsive to the comparing means for designating a non-used one of the slots if the signal quality is less than the criterion; sending means responsive to the designating means for sending a second signal including information in the predetermined slot and for sending a third signal including the information in the designated slot; second receiving means for receiving the second signal and the third signal; second checking means responsive to the second receiving means for checking each signal quality of the second received signal and the third received signal; and adopting means responsive to the checking means for adopting one of the second received and the third received signals if the signal quality of one is higher than the signal quality of the other.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated herein and constitute a part of this specification, illustrate several embodiments of the invention and, together with the description, serve to explain the objects, advantages, and principles of the invention. In the drawings.

DESCRIPTION OF THE PREFERRED EMBODIMENTS

Reference will now be made in detail to the present preferred embodiments of the invention, examples of which are illustrated in the accompanying drawings.

A portable radio telecommunication apparatus referred to as a portable apparatus hereinafter in accordance with the present invention will be detailed with reference to the attached drawings.

Figure 1:
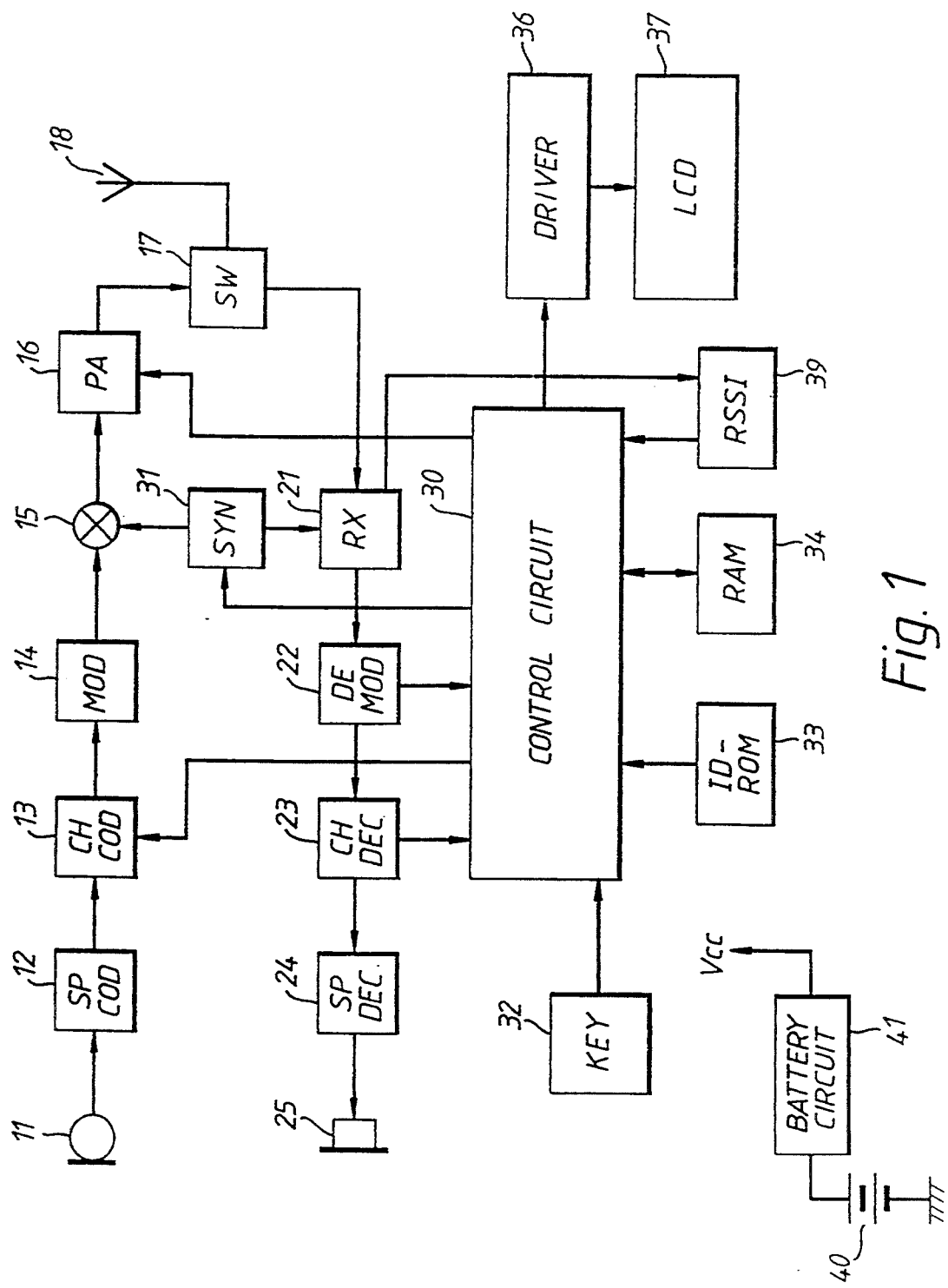
FIG. 1 is a block diagram illustrating a radio telecommunication apparatus according to a first embodiment of the present invention.

FIG. 1 shows a block diagram of the portable apparatus for use in a radio telecommunication system in accordance with an embodiment of the present invention.

The portable apparatus is roughly divided into transmission, reception, and control sections. Reference numeral 40 denotes a power supply such as a battery. The transmission section comprises a microphone 11, a speech coder (SPCOD) 12, an error correction coder (CHCOD) 13, a digital modulator (MOD) 14, an adder 15, a power amplifier (PA) 16, a high frequency switch circuit (SW) 17, and an antenna 18.

A transmit audio signal from the microphone 11 is subjected to a coding at the speech coder 12. The speech coder 12 outputs the digital transmit signal. The error correction coder 13 performs its error correction coding operation on the digital transmit signal and a digital control signal issued from a control circuit 30 (which will be explained later).

The digital modulator 14 generates a modulation signal corresponding to a digital transmit signal issued from the error correction coder 13. The adder 15 adds the modulation signal received from the digital modulator 14 and a carrier signal received from a synthesizer 31 to perform frequency conversion. The power amplifier 16 amplifies a high frequency signal received from the adder 15 to a predetermined level and provides a transmit signal.

The high frequency switch 17 is turned ON only for a period of time corresponding to a transmit time slot designated by the control circuit 30. During this time, the high frequency switch 17 receives the transmit signal from the power amplifier 16 and supplies it to the antenna 18. The transmit signal is transmitted toward a base station (not shown) in the form of a radio transmit signal.

The receiver section includes a receiver (RX) 21, a digital demodulator (DEMOD) 22, an error correction decoder (CHDEC) 23, a speech decoder (SPDEC) 24 and a speaker 25.

The receiver 21 performs its frequency converting operation over a radio receiver signal received from the antenna through the high frequency switch 17 and outputs a receive signal. The digital demodulator 22 performs bits and frame synchronizing operations over the receive signal from the receiver 21 to obtain a synchronized signal and supplies the synchronized signal to the control circuit 30 and a demodulation signal to the error correction decoder 23. The bit and frame synchronizing operations are defined as a word synchronization. The error correction decoder 23 performs its error correction decoding operation over the digital demodulation signal received from the digital demodulation 22 to obtain a digital receive signal.

Furthermore, the error correction decoder 23 provides a digital control signal for scanning channels and communication, to the control circuit 30.

The digital receive signal issued from the error correction decoder 23 is sent to the speech decoder 24. The speech decoder 24 performs its decoding operation over the digital receive signal to provide an analog receive signal. The analog receive signal is then applied to the speaker 25.

Further, the control section includes the control circuit 30, the frequency synthesizer (SYN) 31, a key unit 32, an ID-ROM 33, a RAM 34, an LCD driver 36 and an LCD 37. The synthesizer 31 generates an oscillation frequency necessary for radio communication with the base station under control of the control circuit 30. Furthermore, the control section includes a received electric field intensity detector (RSSI) 39 for detecting electric field intensity of the received signal.

Reference numeral 40 denotes a battery. The battery is connected to a battery circuit 41. The battery circuit 41 receives an output voltage and changes the output voltage to a predetermined voltage Vcc. The predetermined voltage Vcc is supplied to each section in the apparatus.

Figure 2:
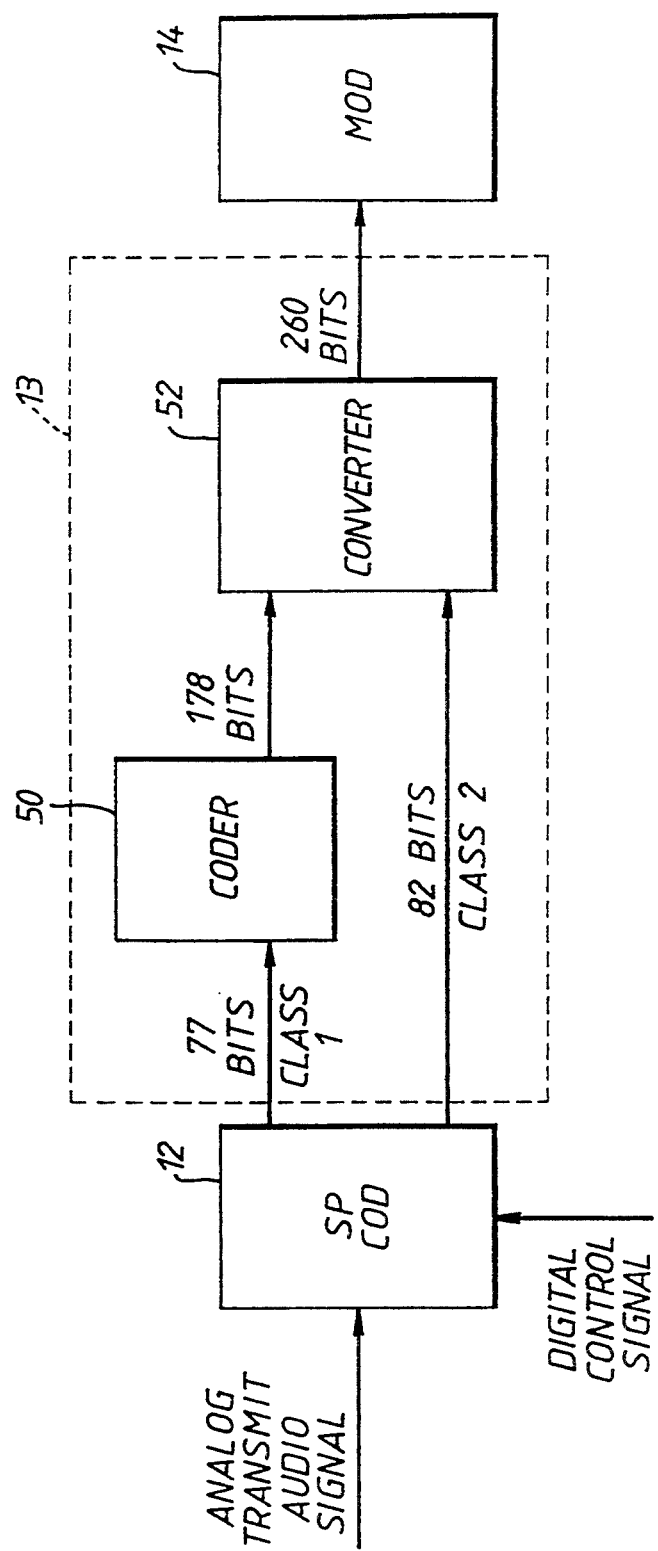
FIG. 2 is a block diagram illustrating an error correction coder of the first embodiment.
Figure 3:
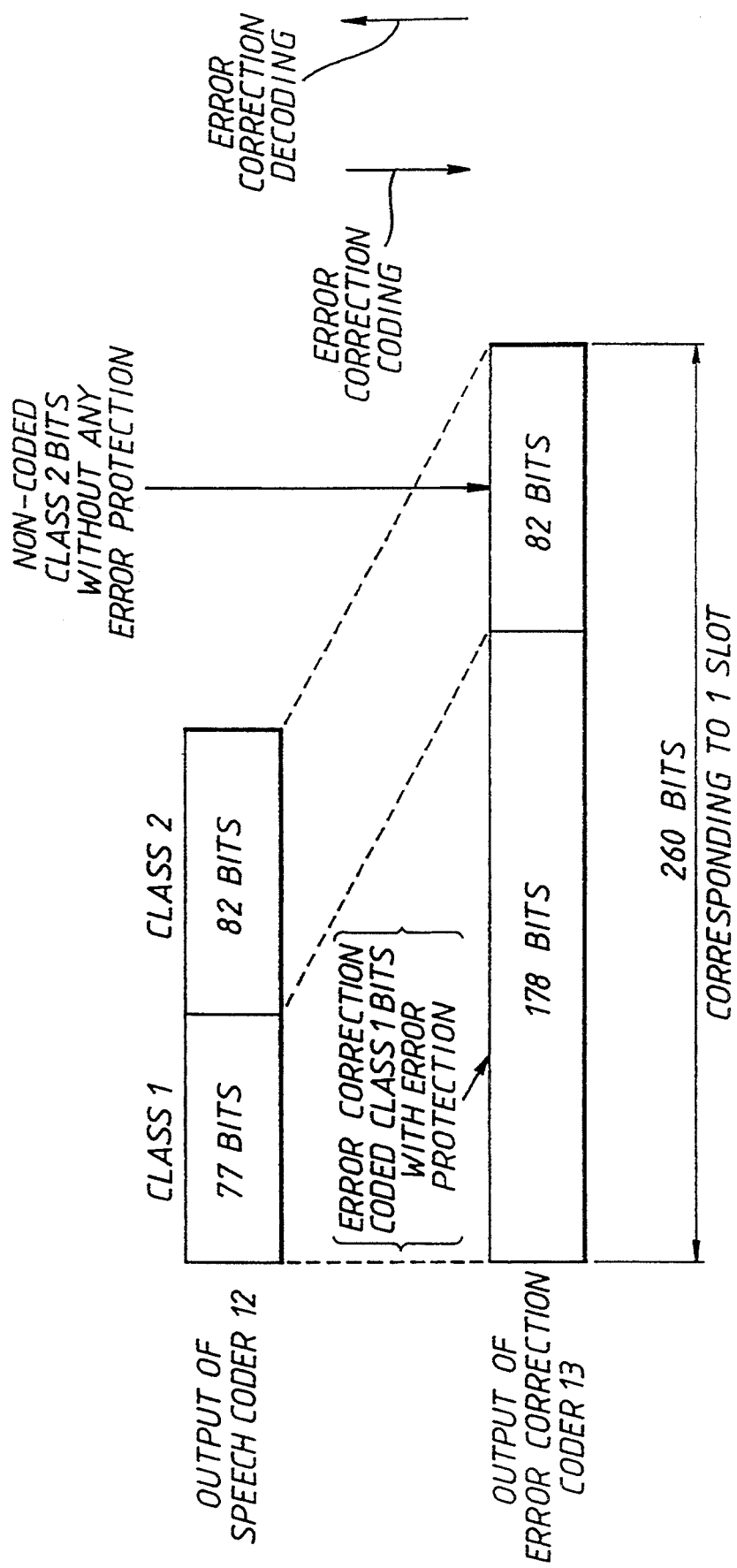
FIG. 3 shows the contents of a slot before and after the error correction coding of the first embodiment.

FIG. 2 shows a detailed block diagram of the error correction coder 13. Referring to FIG. 2, the speech coder 12 converts the analog transmit audio signal to the digital transmit audio signal. There is a total of 159 bits in the digital audio transmit signal and digital control signal from the control circuit 30. The speech coder 12 separates the 159 bits into 77 class 1 bits and 82 class 2 bits. A coder 50 performs its error correction coding operation over only the 77 class 1 bits of information. The coder 50 uses an error correction coding operation as described in "Cellular System Dual-Mode Mobile Station—Base Station Compatibility Standard IS-54B"; TELECOMMUNICATIONS INDUSTRY ASSOCIATION, April 1992, Washington, D.C., U.S.A., referred to IS-54B herein. Other embodiments may use a different error correcting coding operation. As a result, the coder 50 outputs 178 error correction coded class 1 bits. A converter 52 converts the 178 error correction coded class 1 bits and the 82 class 2 bits into 260 bits of serial signal and outputs the serial signal to the modulator 14. FIG. 3 shows the content of bits before and after error correction coding. Referring to FIG. 3, the 260 bits are included in one slot. Since the number of bits included in one slot is limited to 260, the number of bits subjected to the error correction coding is limited to the 77 class 1 bits.

The error correction decoding is the reverse of the error coding operation. That is, the error correction decoder 23 subjects 178 error correction coded class 1 bits of the received digital signal to the error correction decoding. The error correction decoder 23 determines the number of corrected bits. In response to the recognition, the control circuit 30 divides the number of corrected bits by the total number of error correction coded class 1 bits, i.e., 178 bits. The result (corresponding to the number of the corrected bit/178) is called a bit error rate and referred to as a BER. The control circuit recognizes the BER of the received signal and is capable of checking the signal quality of the received signal in response to the BER.

Figure 4:
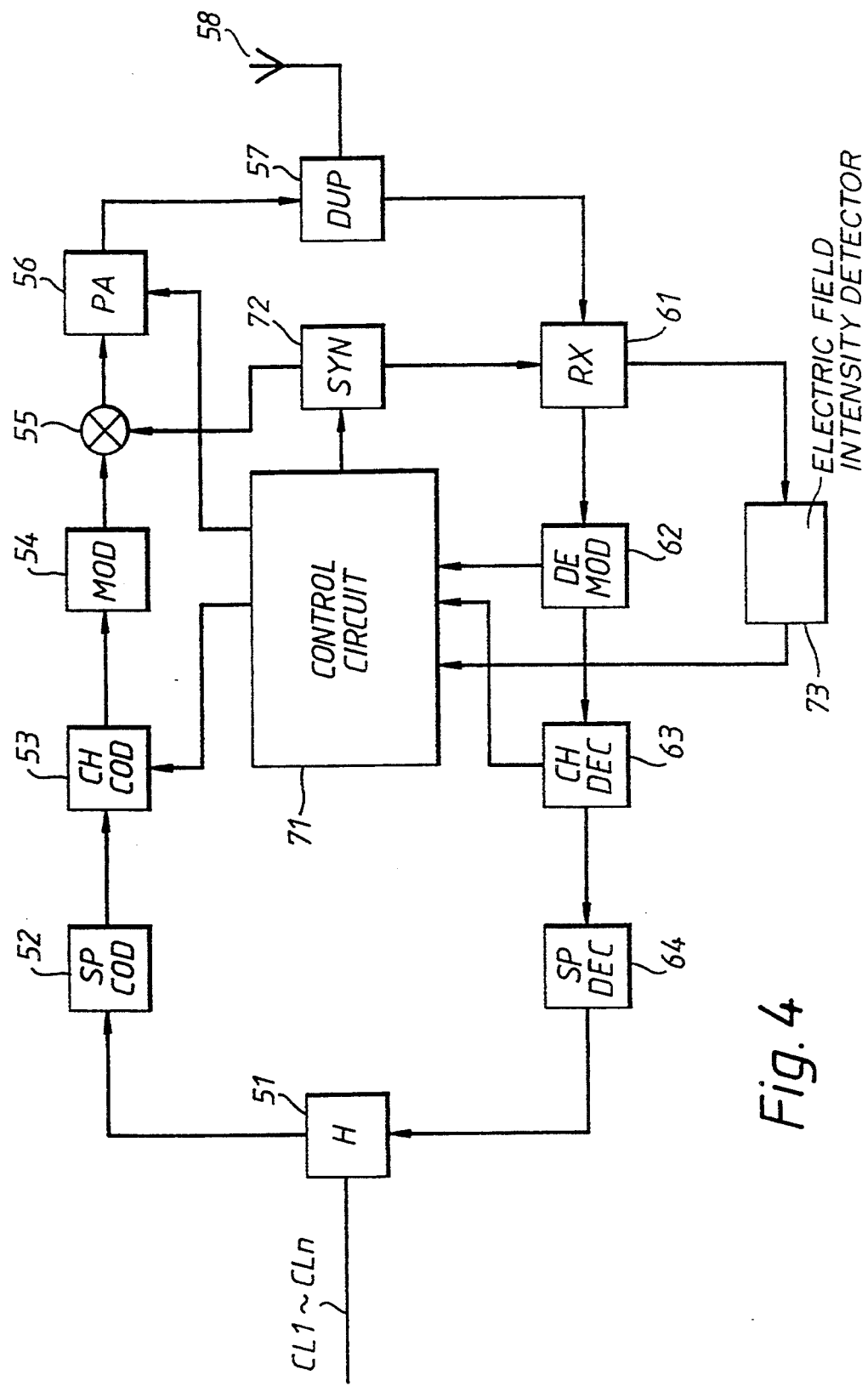
FIG. 4 is a block diagram illustrating a base station of the first embodiment.

FIG. 4 shows a block diagram of the base station including transmission, reception and control sections. Referring to FIG. 4, the transmission section comprises a hybrid circuit 51, a speech coder (SPCOD) 52, an error correction coder (CHCOD) 53, a digital modulator (MOD) 54, an adder 55, a power amplifier (PA) 56, a duplexer 57, and an antenna 58.

The speech coder 52 performs coding of a signal from landlines CL1~CLn. The speech coder 52 outputs the digital transmit signal. The error correction coder 53 performs its error correction coding operation over the digital transmit signal and a digital control signal issued from a control circuit 71. The error correction coder 53 operates in a same manner as the error correction coder 13 provided in the portable apparatus.

The digital modulator 54 generates a modulation signal corresponding to a digital transmit signal issued from the error correction coder 53. The adder 55 adds the modulation signal received from the digital modulator 54 and a carrier signal received from a synthesizer 72 to perform frequency conversion. The power amplifier 56 amplifies a high frequency signal received from the adder 55 to a predetermined level and provides a transmit signal. The duplexer 57 receives the transmit signal from the power amplifier 56 and supplies it to the antenna 58. The transmit signal corresponding to a downward signal is transmitted toward a plurality of portable apparatus in the form of a radio transmit signal.

The receiver section includes a receiver (RX) 61, a digital demodulator (DEMOD) 62, an error correction decoder (CHDEC) and a speech decoder (SPDEC) 64.

The receiver 61 performs its frequency converting operation over a radio receiver signal received from the antenna through the duplexer 57 and outputs a receive signal. The digital demodulator 62 performs bit and frame synchronizing operations over the receive signal received from the receiver 61 to obtain a synchronized signal and supplies the synchronized signal to the control circuit 71 and a demodulation signal to the error correction decoder 63. The bit and frame synchronizing operations are defined as a word synchronization. The error correction decoder 63 performs its error correction decoding operation on the digital demodulation signal received from the digital demodulation 22 to obtain a digital receive signal in a same manner as the error correction decoder 23 provided in the portable apparatus.

Furthermore, the error correction decoder 63 provides a digital control signal for scanning channels and communication to the control circuit 71.

The digital receive signal issued from the error correction decoder 63 is sent to the speech decoder 64. The speech decoder 64 performs its decoding operation over the digital receive signal to provide an analog receive signal. The analog receive signal is then applied to the hybrid circuit 51.

Further, the control section includes the control circuit 71, the frequency synthesizer (SYS) 72, and a received electric field intensity detector (RSSI) 73. The synthesizer 72 generates an oscillation frequency necessary for radio communication with the portable apparatus under control of the control circuit 71. The receive electric field intensity detector 73 detects electric field intensity of the received signal.

Figure 5:
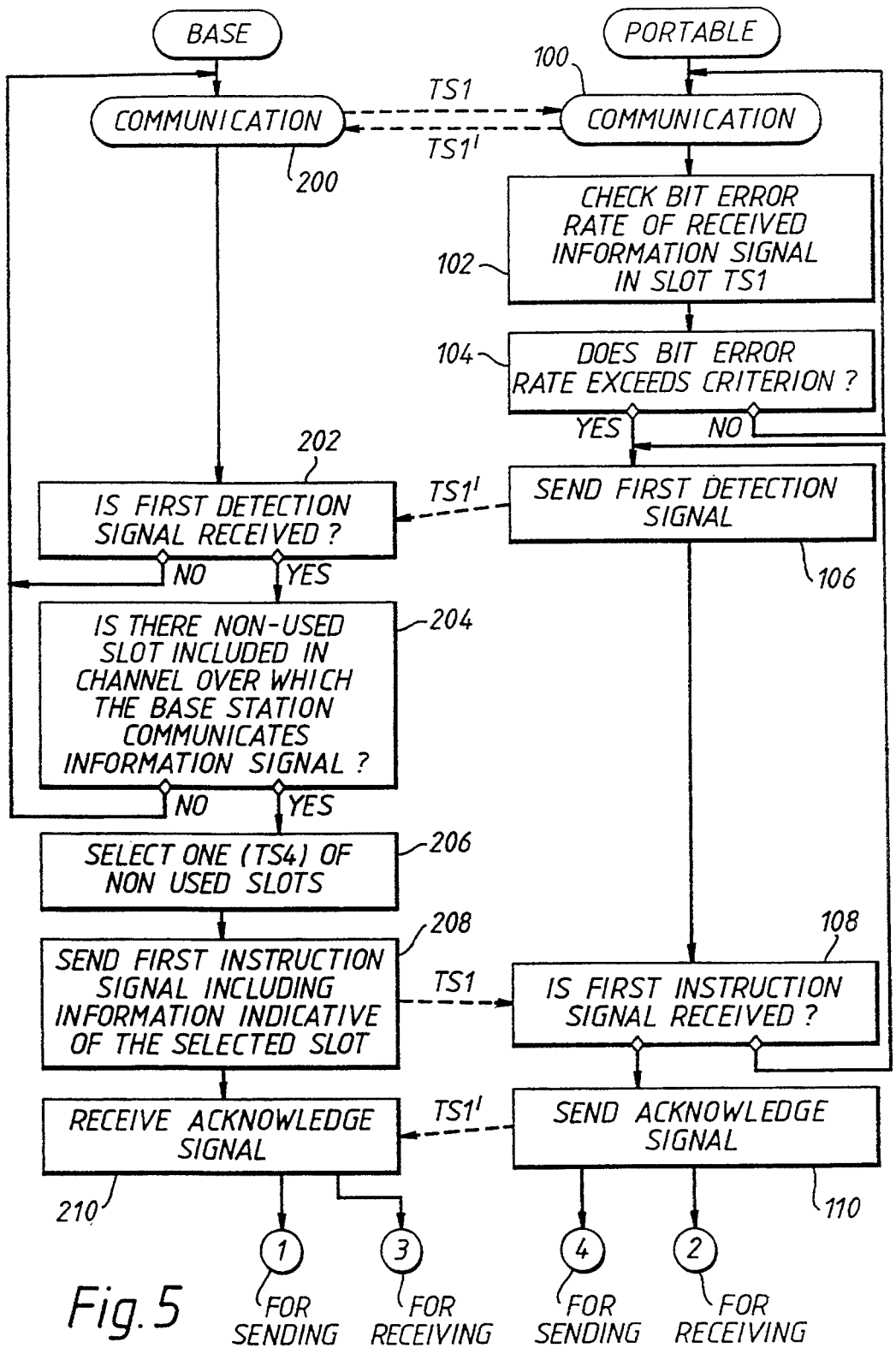
FIG. 5 is a flow chart illustrating a connection control operation sequence in the first embodiment.

FIG. 5 shows an operation of the portable apparatus and the base station. The steps of FIG. 5 are performed by the control circuit 30 and the control circuit 71 Referring to FIG. 5 the portable apparatus communicates with the base station a downward information signal in a downward slot TS1 and an upward information signal in an upward slot TS1' (step 100,200). While communicating with the base station, the portable apparatus receives a downward information signal including speech information and control information from the base station. Furthermore, the portable apparatus checks a BER of the received downward information in the downward slot TS1 (step 102). Thereafter, the portable apparatus compares the BER to a criterion, which is, for example, 3%. If the BER exceeds the criterion (step 104), the portable apparatus sends a first detection signal over the upward slot TS1' (step 106). This signal indicates that the received signal quality is low. Otherwise, the portable apparatus repeats the check of BER of a received downward information signal.

If the base station receives the first detection signal during communication with the portable apparatus (step 202), the base station checks whether or not there is at least one non-used slot in a downward channel over which the base station sends the information signal to the portable apparatus (step 204). If there is at least one non-used slot in the channel, the base station selects one of the non-used slots (step 206).

Figure 6:
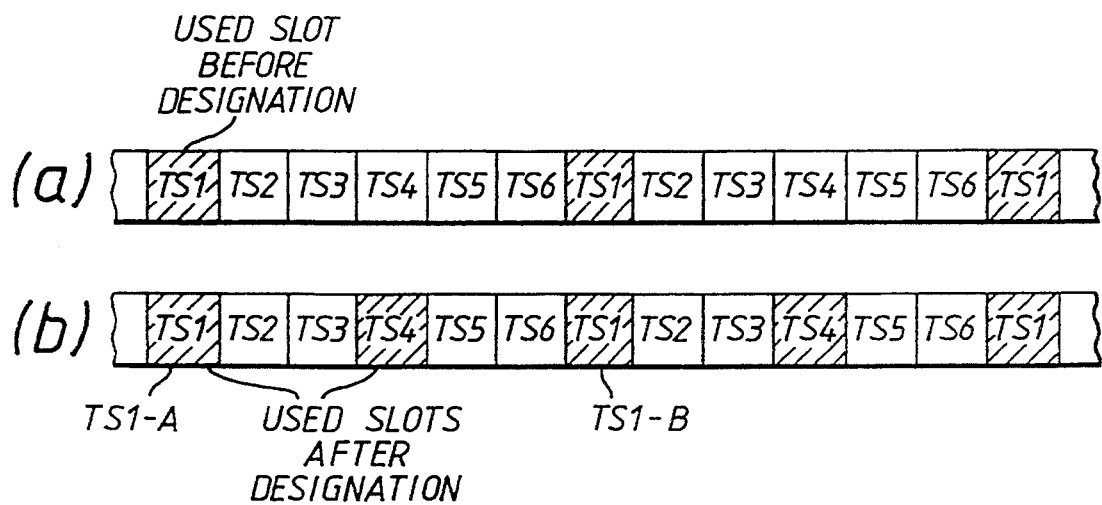
FIG. 6 is a block diagram illustrating time slots before and after the operation of FIG. 5.

FIG. 6 shows a plurality of slots in the downward channel over which the base station sends the downward information signal. Referring to FIG. 6(a), it is found that the slot TS1 is a used one and that the slots TS2, TS3, TS4, TS5 and TS6 are non-used ones. If the BER of the received information signal exceeds the criterion in this state, the base station, in step 206, selects the slot TS4. This is because referring to FIG. 6(b), the slot TS4 is located far away from the slot TS1-A and a following slot TS1-B. Therefore, it is possible to decrease probability that the obstacle between the base station and the portable apparatus influences information signals in two slots TS1, TS4 simultaneously.

Figure 7:
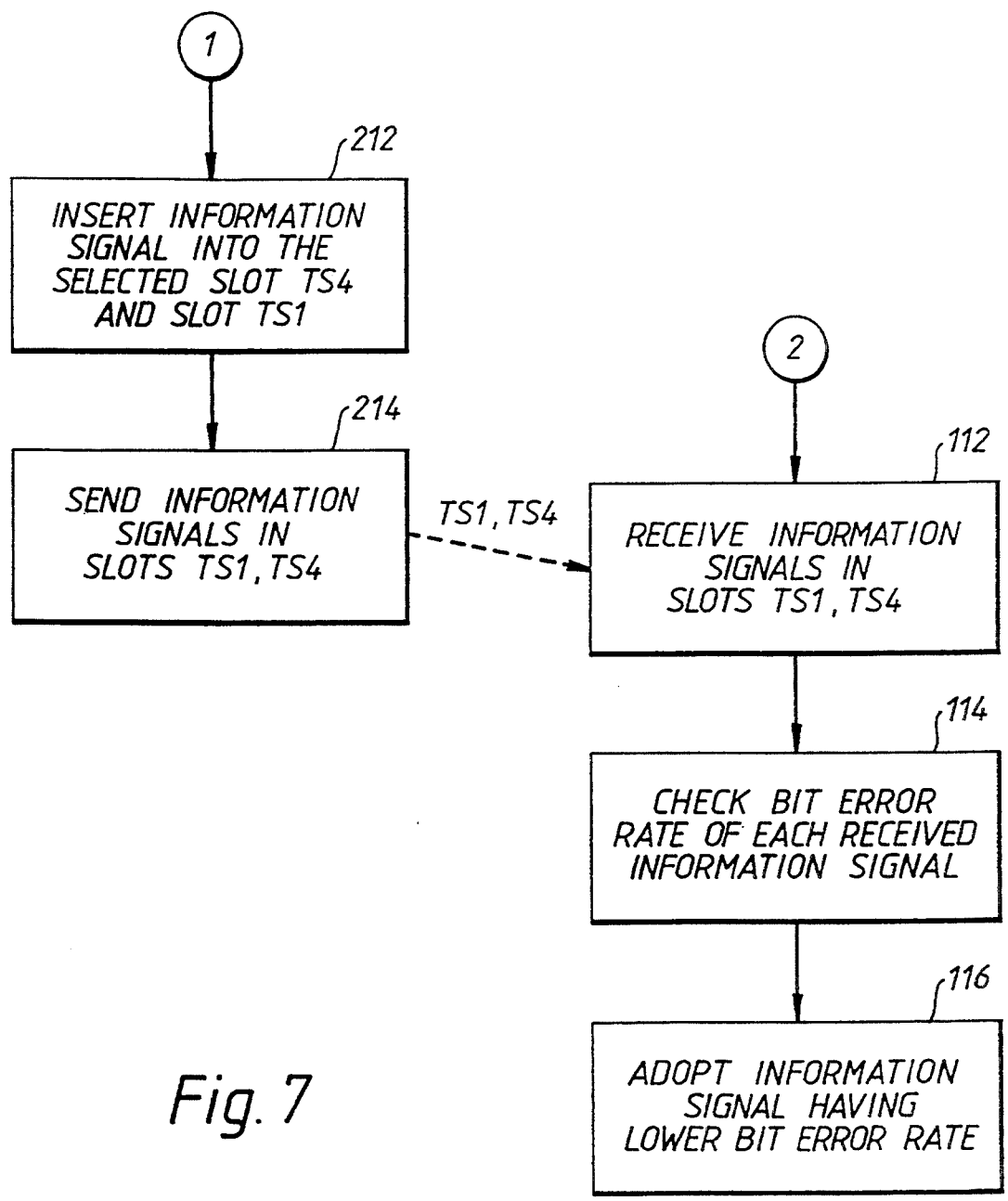
FIG. 7 is a flow chart illustrating a downward signal connection control operation sequence that is performed after certain steps of FIG. 5 in the first embodiment.

Referring again to FIG. 5, after the step 206, the portable apparatus sends a first instruction signal including information indicative of the selected slot TS4 using the downward slot TS1 (step 208). If the portable apparatus receives the first instruction signal during a predetermined period of time after the portable apparatus sends the first detection signal (step the portable apparatus sends an acknowledge signal using the upward slot TS1' to the base station (step 110). Otherwise, the portable apparatus sends the first detection signal again. If the base station receives the acknowledge signal after the base station sends the first instruction signal (step 210), the base station inserts the information signal into the selected slot TS4 (step 212) as shown in FIG. 7. Thereafter, the base station sends the information signals in the downward slots TS1, TS4 to the portable apparatus (step 214). If the portable apparatus receives the information signals in the downward slots TS1, TS4 during a predetermined period of time after sending the acknowledge signal (step 112), the portable apparatus checks each BER of each received information signal (step 114). Thereafter, the portable apparatus compares the BER of the received information signal in the downward slot TS1 to the BER of the received information signal in the downward slot TS4. In response to the comparison, the portable apparatus adopts the information signal having lower BER (step 116).

Figure 8:
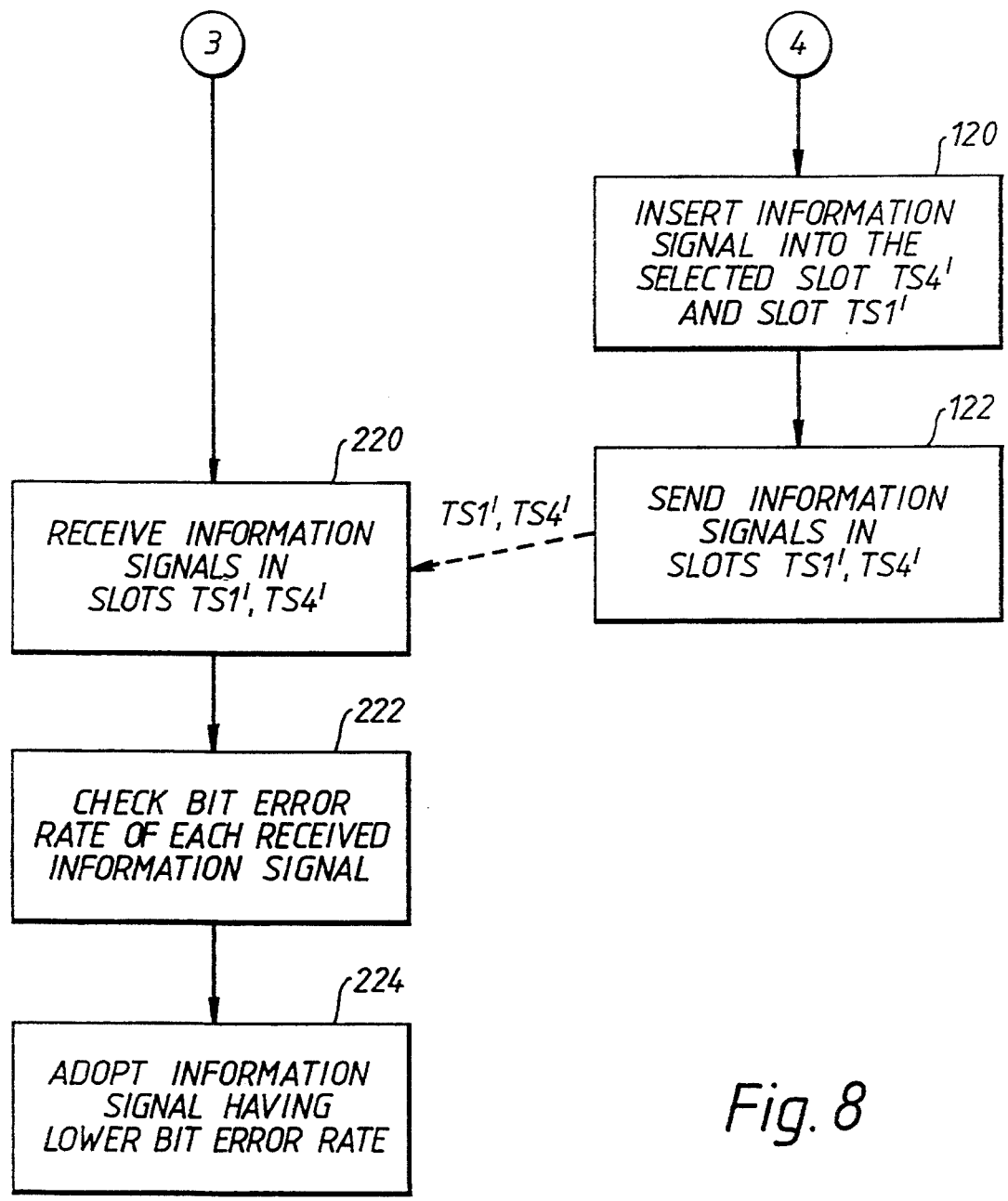
FIG. 8 is a flow chart illustrating an upward signal connection control operation sequence that is performed after certain steps of FIG. 5 in the first embodiment.

Referring again to FIG. 5, after the base station receives the acknowledgment signal (step 210), the portable apparatus sends an upward information signal to the base station in the same manner as the operation in Which the base station sends the downward information signals using the slots TS1, TS4. After a predetermined period of time of the step 110 of FIG. 5, as shown in FIG. 8, the portable apparatus inserts the information signal into the selected upward slot TS4' and the upward slot TS1' (step 120). Thereafter, the portable apparatus sends the upward information signals in the upward slots TS1', TS4' (step 122). If the base station receives the upward information signals in the upward slot TS1', TS4' (step 220), the base station checks a BER of the received upward information signal in the upward slot TS1' and a BER of the upward received information signal in the upward slot TS4' (step 222). Thereafter, the base station adopts the upward information signal having lower BER (step 224).

Figure 9:
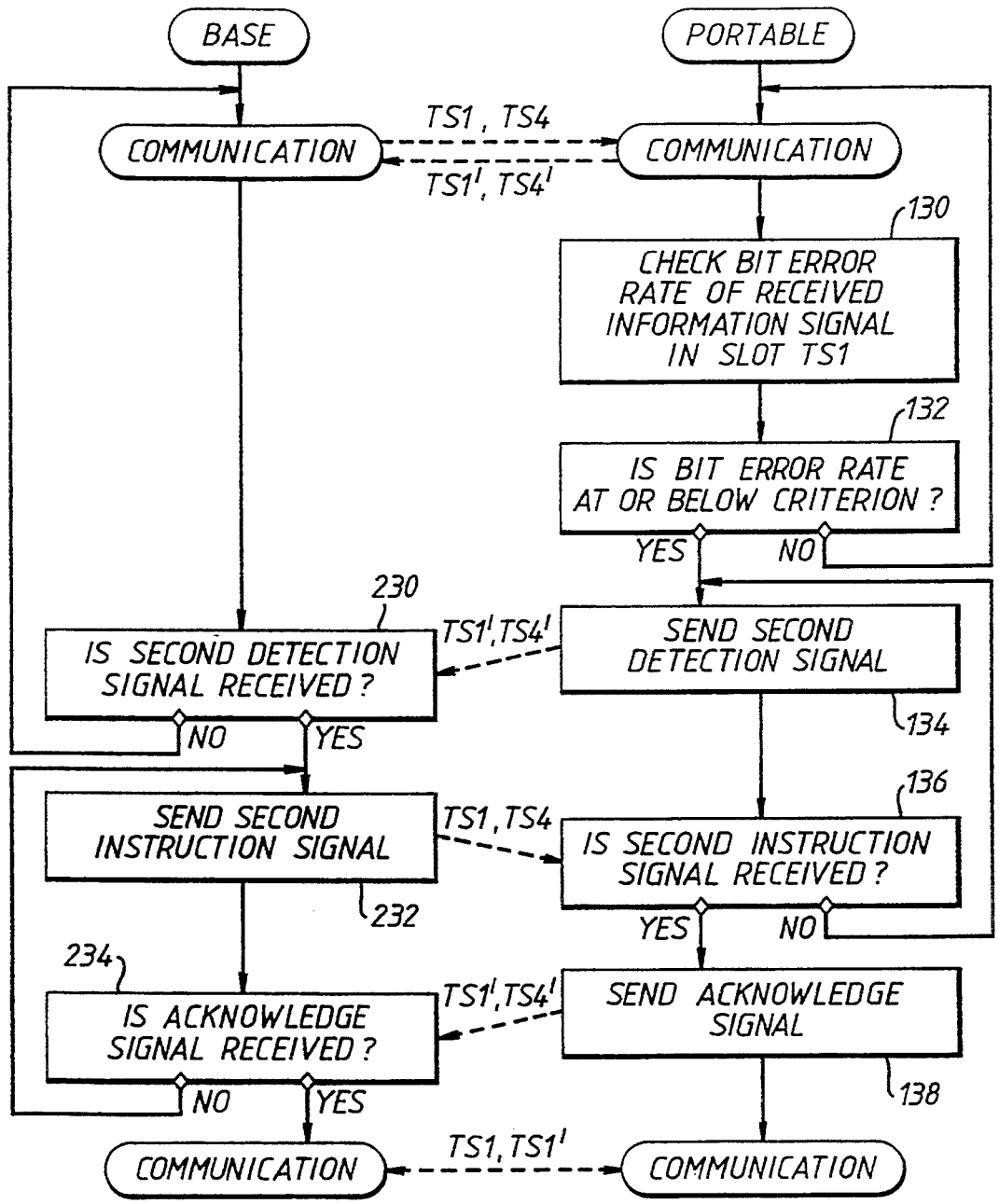
FIG. 9 is a flow chart illustrating a connection control operation sequence in the first embodiment when a signal quality is recovered.

FIG. 9 shows an operation in the event that the signal quality is recovered while the portable apparatus communicates the information signals using the downward slots TS1, TS4 and the upward slots TS1', TS4' with the base station. Referring to FIG. 9, the portable apparatus checks a BER of a received downward information signal in the downward slot TS1 (step 130). Thereafter if the BER is at or below the criterion (step 132), the portable station sends a second detection signal using the upward slots TS1', TS4' (step 134). This means that the signal quality of the received downward information signal ms recovered. The second detection signal includes an indication that the downward slot TS1 should be used instead of downward slots TS1, TS4 and that the upward slot TS1' should be used instead of upward slots TS1', TS4'. Otherwise, the portable apparatus repeats the check. If the base station receives the second detection signal (step 230), the base station sends a second instruction signal to the portable apparatus using the downward slots TS1, TS4 (step 232). If the portable apparatus receives the second instruction signal during a predetermined period of time after sending the second detection signal (step 136), the portable apparatus sends acknowledge signal using the upward slots TS1', TS4' (step 138) to the base station. If the base station receives the acknowledge signal (step 234), the base station communicates the downward and upward information signals using only the downward slot TS1 and the upward slot TS1' with the portable apparatus.

According to the embodiment, lowering of the information signal quality is detected at the portable apparatus during the communication. The portable apparatus sends the detection signal to the base station. The base station checks whether or not there is non-used slot in the channel over which the base station sends the information signal to the portable apparatus.

The base station sends the instruction signal including an indication that two slots should be used instead of one slot. Then, slots used for communication between the base station and the portable apparatus are altered from one to two. Therefore, even if the information signal quality is lowered, it is possible to compensate the lowering of the information signal quality, compared with a conventional system wherein the information signal is communicated using only one slot. In addition, since alternation from one slot to two slots is performed only when there is a non-used slot in the channel over which the base station communicates the information signal with the portable apparatus, this operation does not interrupt the communication between the other portable apparatus and the base station. Since a non-used slot is effectively used, it is possible to increase an efficiency of the availability of the radio channel.

Furthermore, if the information signal quality recovers during communicating the information signals using each assigned two slots of the downward slots and the upward slots, the base station changes the number of slots for use from two to one as shown in FIG. 9. Therefore, this embodiment prevents the two slots being used even if the information signal quality recovers. As a result, the base station is capable of assigning limited slots effectively and therefore maintains high efficiency of using the slots.

Figure 10:
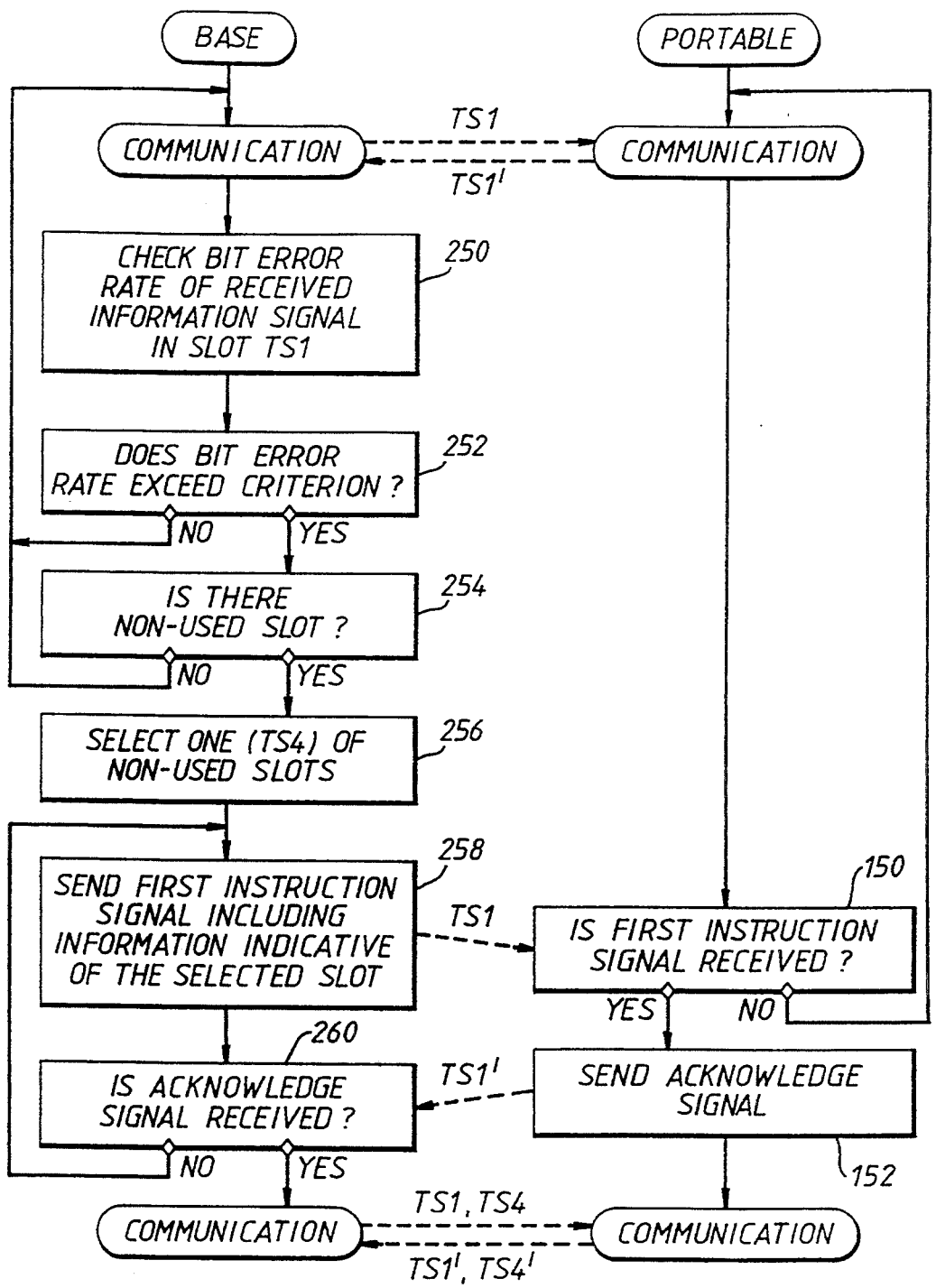
FIG. 10 is a flow chart illustrating a connection control operation sequence in a second embodiment of the present invention.

This invention is not limited to the embodiment. FIG. 10 shows a second embodiment. The second embodiment differs from the first embodiment with respect to the detection of the information signal quality. Referring to FIG. 10, the base station receives an upward information signal in the upward slot TS1' from the portable apparatus and checks a BER of the received upward, information signal (step 250). If the BER exceeds the criterion (step 252), the base station checks whether or not there is at least one non-used slot (step 254). Otherwise, the base station repeats the above operation. If there is at least one non-used slot, the base station selects one of the non-used slots (step 256). Thereafter, the base station sends a first instruction signal using a downward slot TS1 including information indicative of the selected slot (step 258). If the portable apparatus receives the first instruction signal during communication with the base station (step 150), the portable apparatus sends an acknowledge signal using an upward slot TS1' (step 152). If the base station receives the acknowledge signal (step 260), the base station communicates the information signal using the downward and upward slots TS1, TS1' and the selected downward and upward slots TS4 and TS4' with the portable apparatus in the same manner as the first embodiment.

Figure 11:
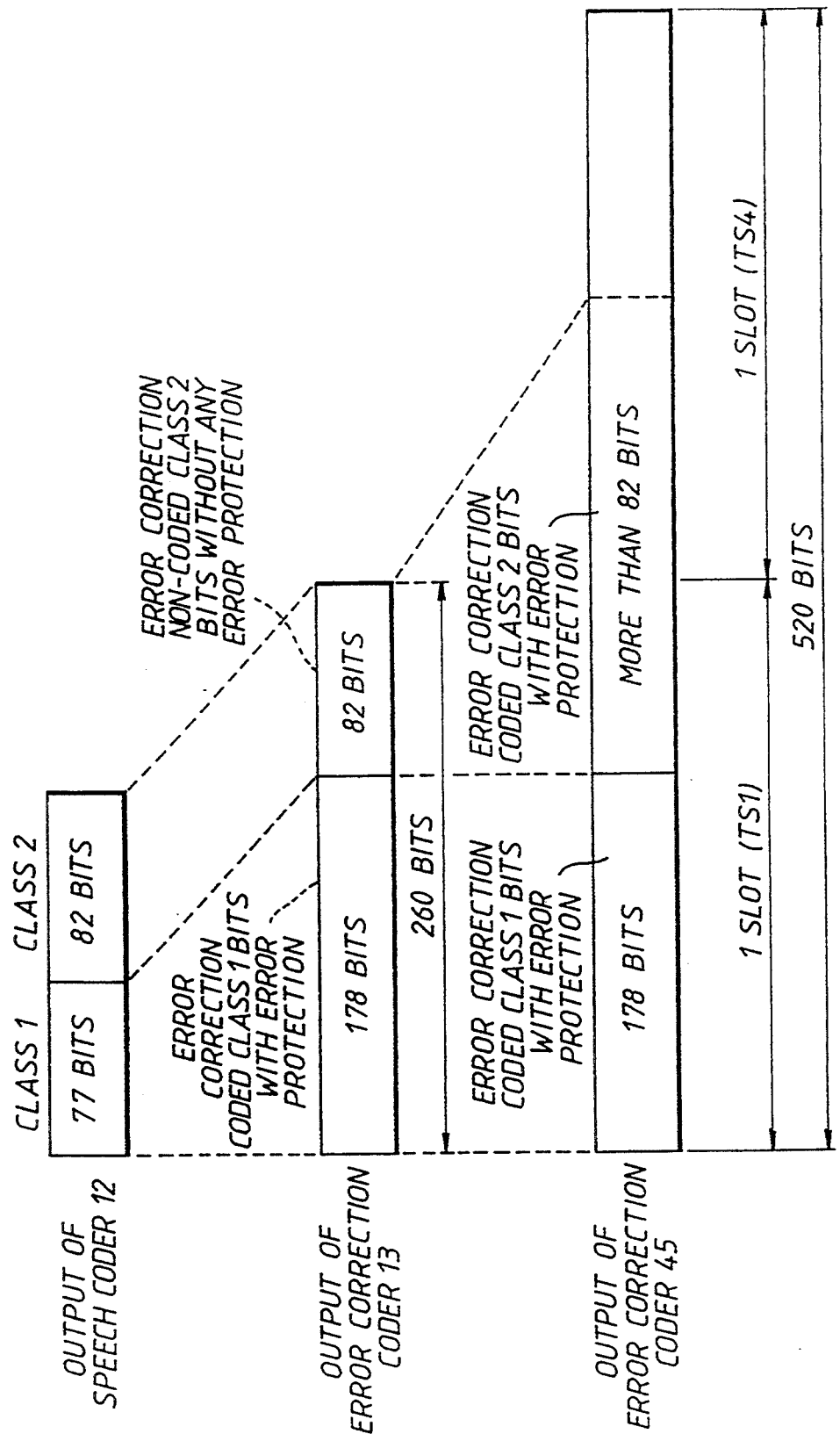
FIG. 11 is a block diagram illustrating a third embodiment of the present invention.

FIG. 11 shows a third embodiment and a difference between the first and third embodiments. Referring to FIG. 11, in the first embodiment, the speech coder 12 outputs the 77 class 1 bits and the 82 class 2 bits. The error correction coding is applied to only the 77 class 1 bits. As a result, the 77 class 1 bits are changed to the 178 error correction coded class 1 bits. The error correction coding is not applied to the 82 class 2 bits because one slot assigned to a portable apparatus has only 260 bits, and has room only for the error correction coded 178 class 1 bits and the non-error correction coded 82 class 2 bits.

On the contrary, in the third embodiment, in the event that the portable apparatus is assigned two slots in step 210 of FIG. 5, the two slots having 520 bits has room for not only the error correction coded 178 class 1 bits but also for more than 82 error correction coded class 2 bits, Therefore, an error correction coder 45 in the third embodiment applies the error correction coding to not only the class 1 bits but also the class 2 bits. This error correcting operation applied to the 82 class 2 bits is same as that applied to the 77 class 1 bits.

Figure 12:
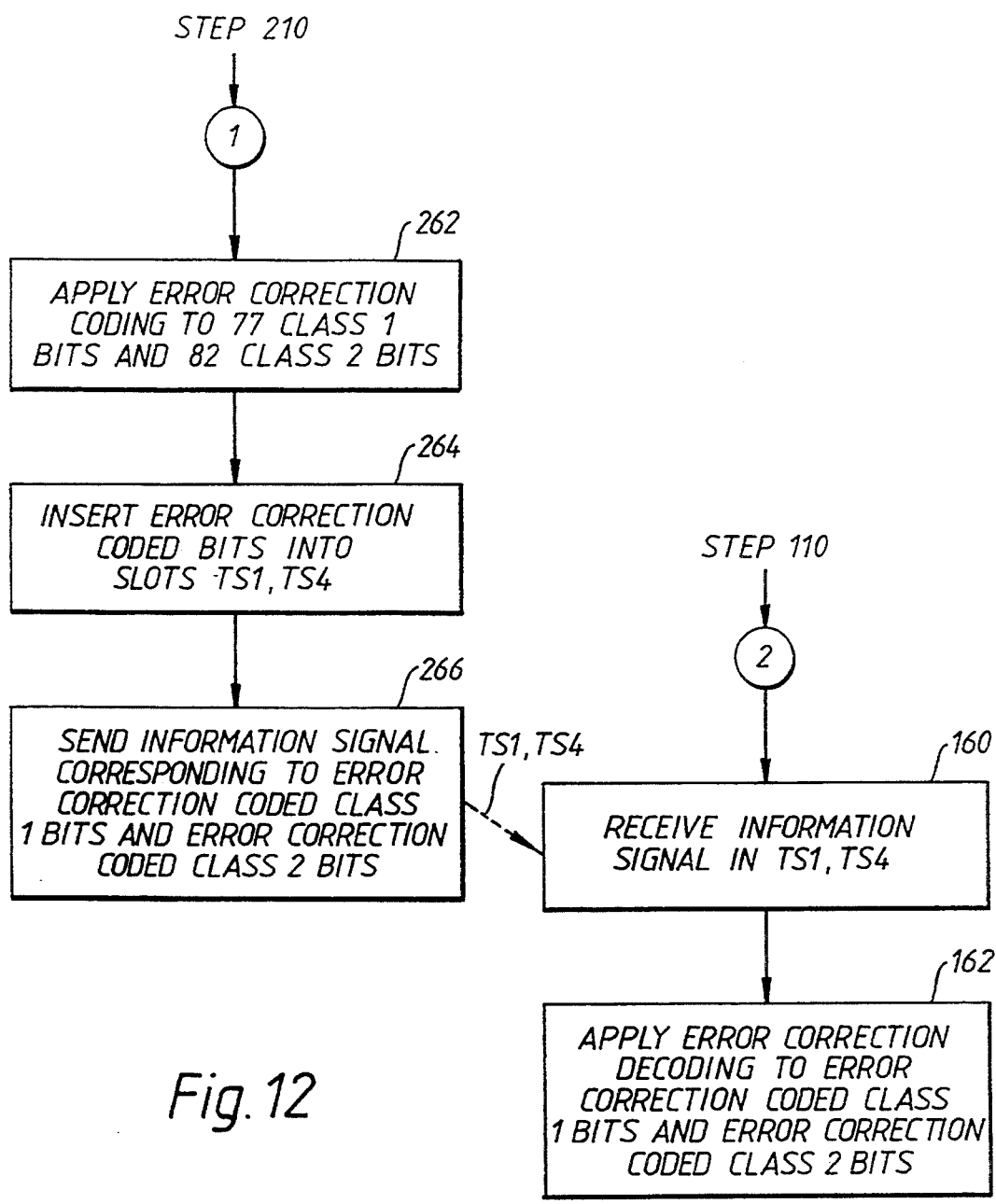
FIG. 12 is a flow chart illustrating a downward signal connection control operation sequence that is performed after certain steps of FIG. 5 in the third embodiment.

FIG. 12 shows the operation of the third embodiment. After the step 210 of FIG. 5, the base station applies the error correction coding to the 77 class 1 bits and the 82 class 2 bits (step 264). Thereafter, the base station inserts the error correction coded class 1 bits and the error correction coded class 2 bits into the downward slots TS1, TS4 (step 264). After that, the base station sends a downward information signal corresponding to the error correction coded class 1 bits and the error correction coded class 2 bits using the slots TS1, TS4 (step 266).

If the portable apparatus receives the information signal (step 160), the portable apparatus applies the error correction decoding to the error correction coded class 1 bits and the error correction coded class 2 bits (step 162). Otherwise, the portable apparatus waits to receive the information signal.

An upward signal operates in a same manner as the downward information signal operation.

Figure 13:
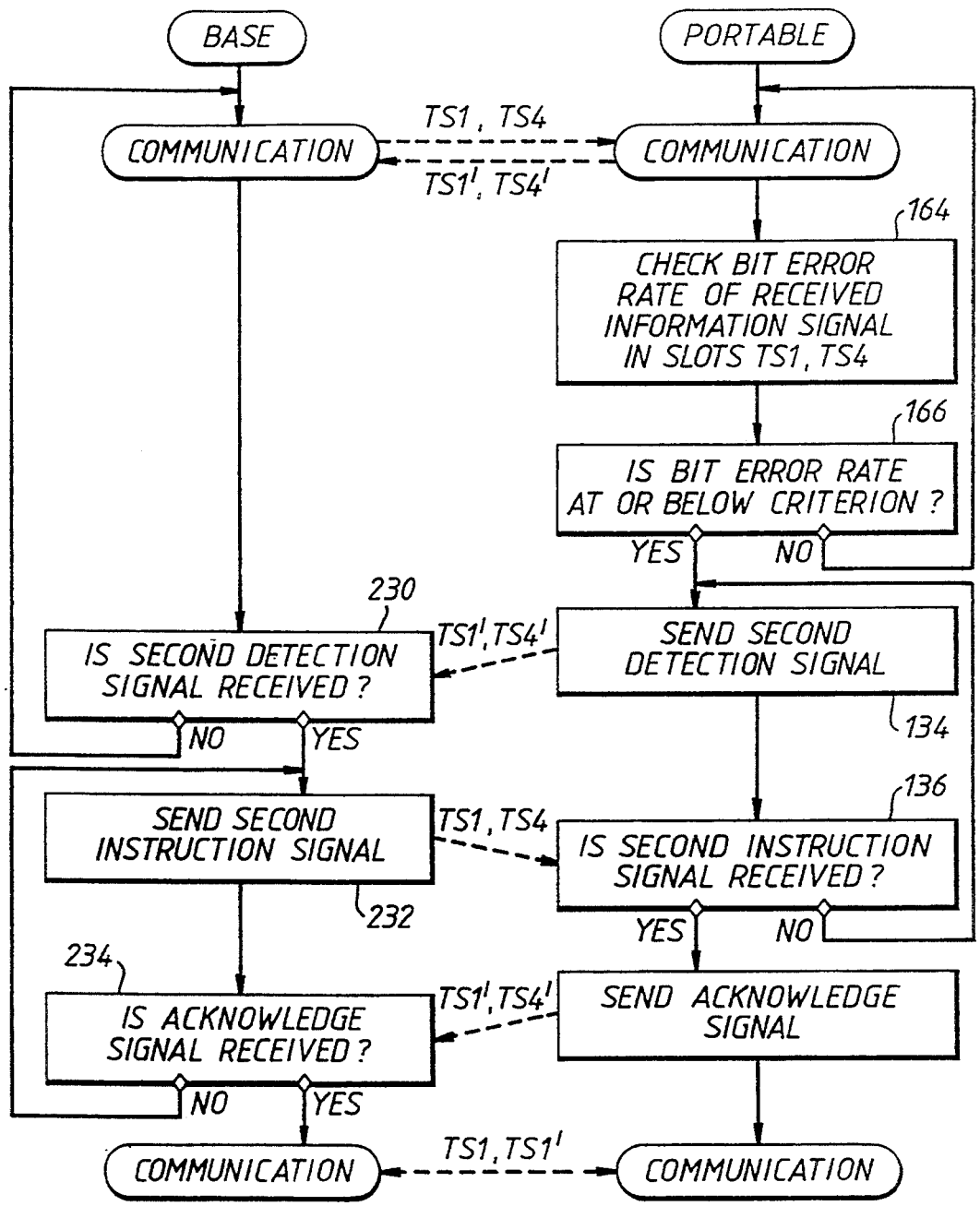
FIG. 13 is a flow chart illustrating a connection control operation sequence in the third embodiment when a signal quality is recovered.

FIG. 13 shows an operation after the BER of a received information signal is recovered. Referring to FIG. 13, during communication using the downward slots TS1, TS4 and the upward slots TS1', TS4', the portable apparatus checks the BER of a received downward information signal in the downward slots TS1, TS4 (step 164). If the BER is at or below the criterion (step 166), the portable apparatus sends the second detection signal using the upward slot TS1', TS4' (step 134). Following operations are same as that of FIG. 5 and therefore further such description of the operations is unnecessary.

Figure 14:
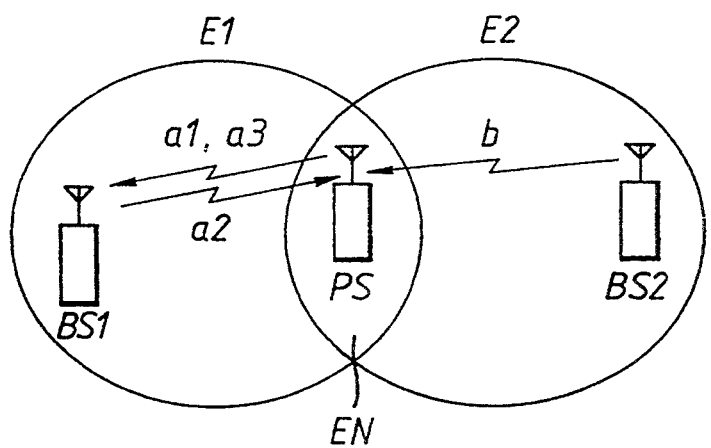
FIG. 14 is a block diagram illustrating the radio telecommunication system according to a fourth embodiment of the present invention.

Obstacles between the portable station and the base station are not the only cause of low signal quality. FIG. 14 shows another possible reason. Referring to FIG. 14, a base station BS1 covers an area E1. A base station BS2 covers an area E2. An area EN is covered by the areas E1 and E2.. A portable apparatus PS is located in the area EN. In this state, the lowering of the signal quality of the downward signal from the base station BS1 occurs because the portable apparatus is far away from the base station BS1.

Figure 15:
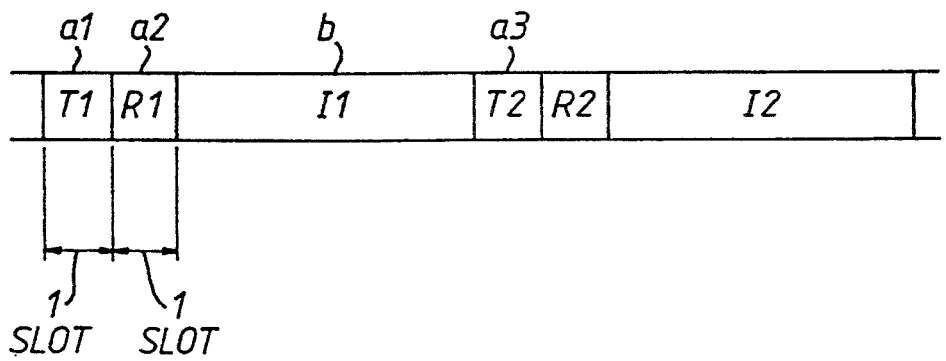
FIG. 15 is a diagram illustrating a time period during which the portable apparatus operates according to a TDMA system of the fourth embodiment.

FIG. 15 shows time periods during which the portable apparatus PS communicates with the base station BS1. Referring to FIGS. 14, 15, the portable apparatus PS sends an upward signal a1 to the base station BS1 during a time period T1 corresponding to a transmit slot.

The portable apparatus PS receives a downward signal a2 from the base station BS1 during a time period R1 corresponding to a receive slot. Further, the portable apparatus PS receives a signal b from the adjacent base station BS2 during a period I1 corresponding to an idle slot. After receiving the signal b, the portable apparatus PS detects an electric field intensity of the received signal b using the RSSI 39. Thereafter, the portable apparatus sends an upward signal a3 including the electric field intensity of the received signal b to the base station BS1 during a period T2. The base station BS1 receives the upward signal a3 and stores the electric field intensity of the signal b into its memory.

Figure 16:
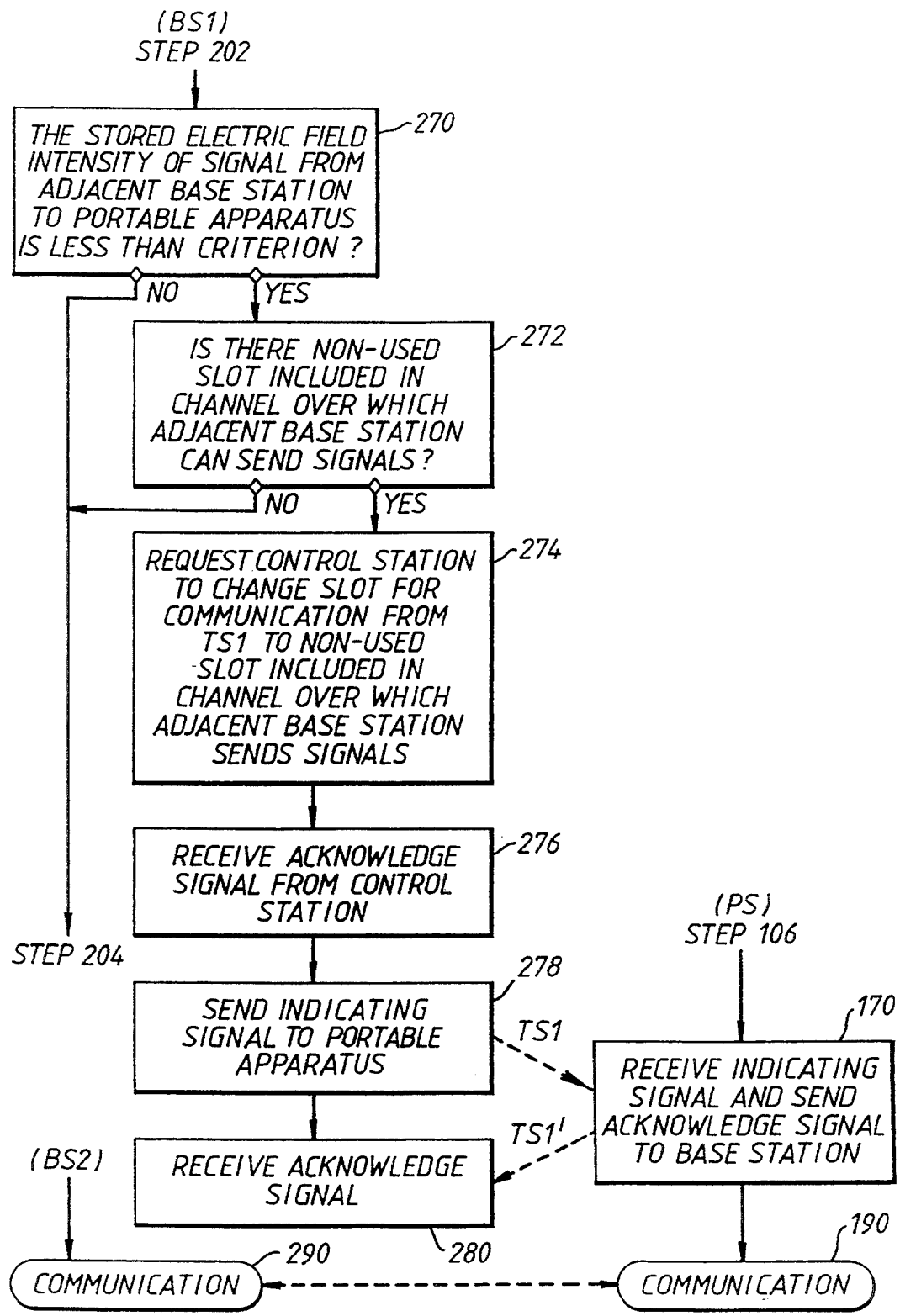
FIG. 16 is a flow chart illustrating a connection control operation sequence of the fourth embodiment.
Figure 18:
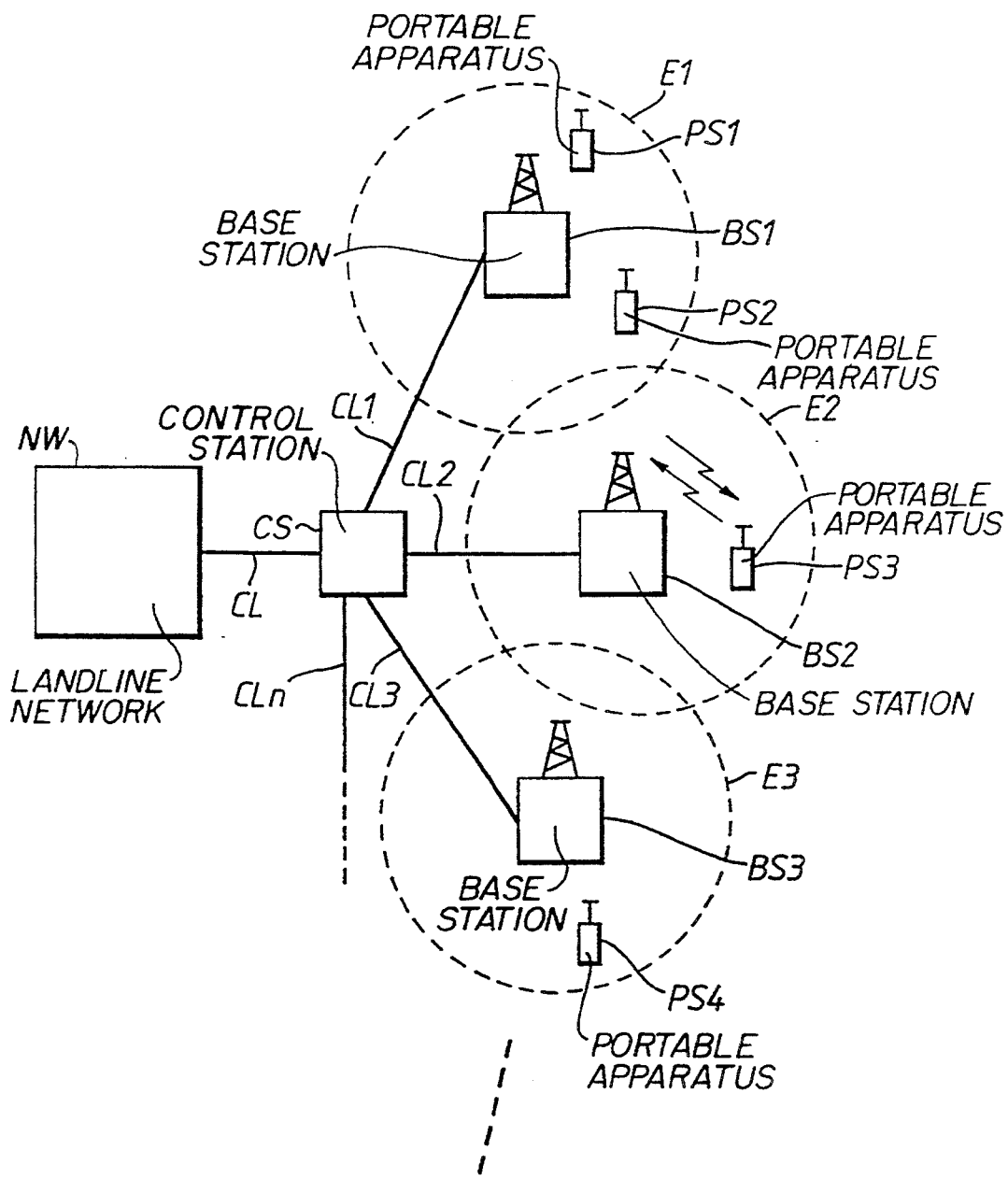
FIG. 18 is a diagram illustrating a conventional radio telecommunication system.
Figure 19:
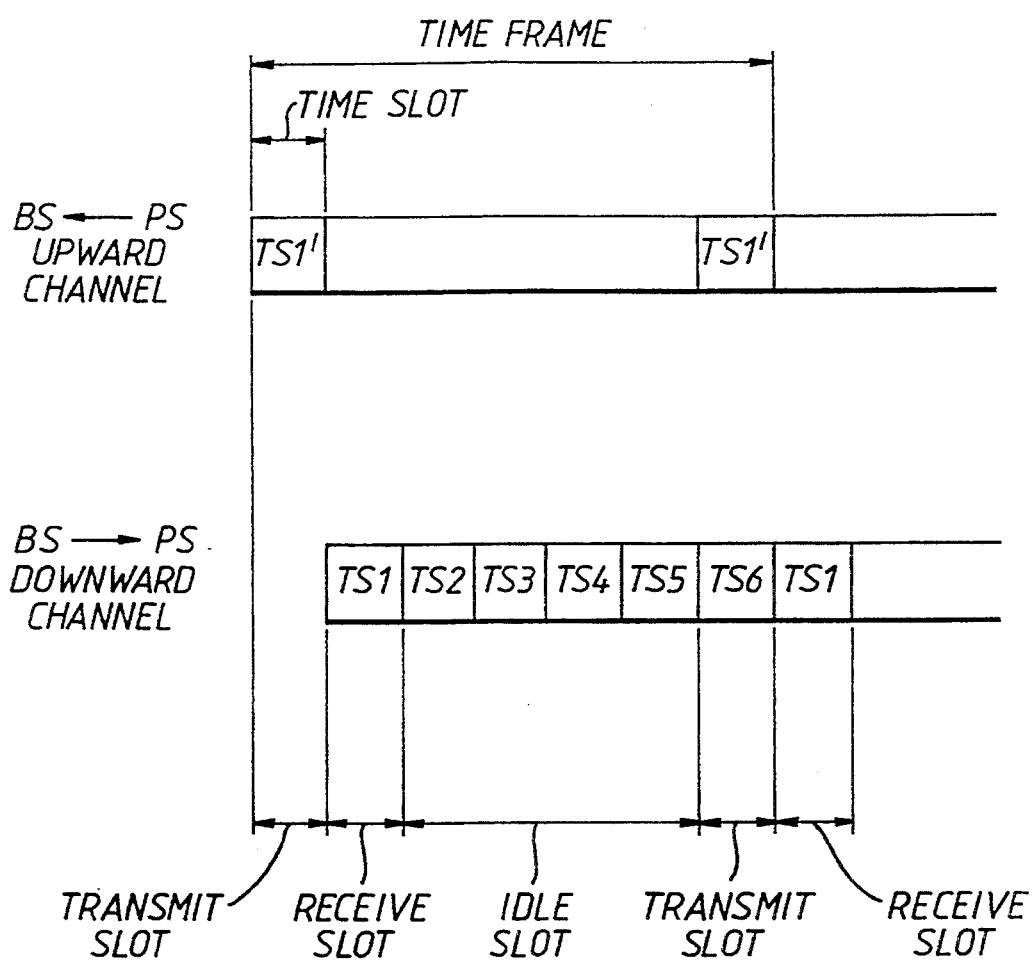
FIG. 19 is an upward signal format from the apparatus to a base station and a downward signal format from the base station to the apparatus in the TDMA system.

In this state, referring again to FIG. 5, in step 100, the portable station receives a downward signal from the base station BS1. If the BER of the received downward signal exceeds the criterion, the portable apparatus sends the first detection signal to the base station BS1 (step 102, 104, 106). The base station BS1 receives the first detection signal (step 202). FIG. 16 shows a fourth embodiment including steps inserted between step 202 and step 204 of FIG. 5 in the first embodiment. If the stored electric field intensity of the signal b from the adjacent base station BS2 to the portable apparatus PS is less than a criterion, e.g., $-110$ dBm, (step 270), the base station BS1 performs the operation in the manner indicated from step 204 onward. Otherwise, the base station BS1 sends a signal to and receives a signal from the adjacent base station BS2 to confirm whether or not there is a non-used slot in each channel over which the adjacent base station can send signals (step 272). If there is a non-used slot, the base station BS1 requests the control station CS to change a slot assigned to the portable apparatus PS from to the confirmed non-used slot in a channel over which the adjacent base station BS2 can send signals (step 274). Otherwise, if there is no non-used slot, the base station BS1 performs the same operation as step 204. In this case, if the base station BS1 receives an acknowledge signal from the control station (step 276), the base station BS1 sends an indicating signal to the portable apparatus PS using the downward slot TS1 (step 278). If the portable apparatus PS receives the indicating signal, the portable apparatus PS sends an acknowledge signal to the base station using the upward slot TS1' (step 170).

If the base station BS1 receives the acknowledge signal from the portable apparatus, the base station BS1 sends a confirmation signal to the control station CS (step 280). After that, the control station CS changes the slot assigned to the portable apparatus PS from TS1 to the confirmed non-used slot. As a result, the communication between the portable apparatus PS and the base station BS1 ceases and a communication between the portable apparatus PS and the base station BS2 starts (steps 190, 290). This operation from steps 270 to 290 and steps 170, 190 is called a "hand-off" operation, and is described generally in the IS-54B.

In the embodiments, the BER is used for detecting the received information signal quality. This invention is not limited to the embodiments described. The electrical field intensity of the received information signal also may be used for detecting the signal quality. In fact, any known method of detecting signal quality may be used.

Figure 17:
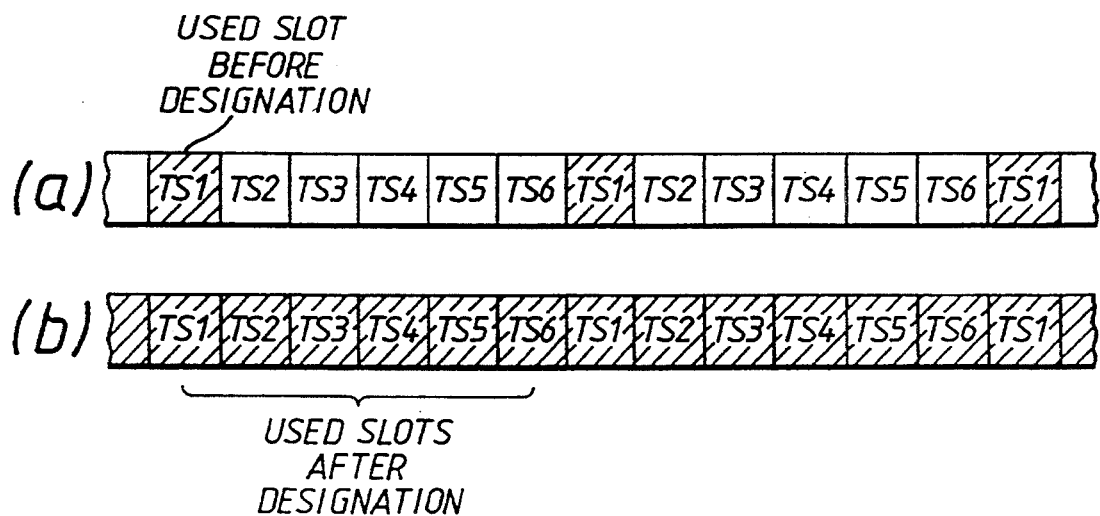
FIG. 17 shows a block diagram illustrating time slots before and after operation of another embodiment.

Furthermore, in the described embodiments, when the signal quality is lower than a criterion, the number of time slots used is altered from one to two. However, one slot also may be altered to a number of slots that is more than two slots. FIG. 17 shows a slot alternation from one slot to six slots.

Furthermore, in the embodiment, it is explained that one criterion is set to detect the lowering of the signal quality and the number of the used slot is altered in two steps in response to the results of the detection. However, a plurality of criteria may be set to detect the lowering of the signal quality. The number of the slots may be altered in or above three steps in response to results of the detection.

We claim:

1. A radio telecommunication system having radio channels, each radio channel including a plurality of frames, each frame including a plurality of slots, each slot being arranged sequentially in time and being designated by a corresponding slot number according to a location of said each slot in each of said plurality of frames, said plurality of frames and said slots being generated by time division, wherein the system encompasses a plurality of areas each having a base station, each of which communicates a first signal in a first slot, said first slot being in a first frame and having a predetermined first slot number, said first signal being communicated with a radio telecommunication apparatus, the system comprising:

first receiving means for receiving the first signal;
first checking means responsive to the first receiving means for checking a signal quality of the first received signal;
comparing means responsive to the first checking means for comparing the signal quality to a criterion;
designating means responsive to the comparing means for designating a second slot in a second frame if the signal quality is less than the criterion, said second slot having a second slot number;
sending means responsive to the designating means for sending a second signal including information in a third slot in the second frame, said third slot having a slot number which is the same as the first slot number, said sending means also for sending a third signal including the information in said second slot;
second receiving means for receiving the second signal and the third signal;
second checking means responsive to the second receiving means for checking each signal quality of the second received signal and the third received signal; and
adopting means responsive to the second checking means for adopting one of the second received signal and the third received signal if the signal quality of one is higher than the signal quality of the other.

2. The radio telecommunication system of claim 1, further comprising means, responsive to the second checking means, for comparing the signal quality of the second received signal to the criterion, and means for communicating between the radio telecommunication apparatus and one of said base stations only a fourth signal, said fourth signal being included in a fourth slot, said fourth slot being in a third frame and having a slot number the same as the first slot number.

3. The radio telecommunication system of claim 1, wherein each signal quality of at least one of the first, second and third received signals is a bit error rate generated by dividing a number of error corrected bits of the received signal by a number of error correction coded bits of the received signal.

4. The radio telecommunication system of claim 1, wherein each signal quality of at least one of the first, second and third received signals is an electric field intensity of one of the first, second and third received signals.

5. A radio telecommunication system having radio channels, each radio channel including a plurality of frames, each frame including a plurality of slots, each slot being arranged sequentially in time and being designated by a slot number according to a location of said each slot in each of said plurality of frames, said plurality of frames and said plurality of slots being generated by time division, the system communicating a first signal in a first slot in a first frame, said first slot being predetermined and having a predetermined first slot number, said first signal being communicated between one of a plurality of base stations and said radio telecommunication apparatus, the system comprising:

receiving means for receiving the first signal;
checking means responsive to the receiving means for checking a signal quality of the first received signal;
comparing means responsive to the checking means for comparing the signal quality to a criterion;
designating means responsive to the comparing means for designating a second slot in a second frame if the signal quality is less than the criterion, said second slot having a second slot number; and
communicating means responsive to the designating means for communicating between said radio telecommunication apparatus and said one base station a second signal including information in a third slot in said second frame, said third slot having a slot number equal to the first slot number, and said communicating means also for communicating between said radio telecommunication apparatus and said one base station a third signal including the information in said second slot.

6. The radio telecommunication system of claim 5, further comprising means, responsive to the communicating means, for comparing the signal quality of the second communicated signal to the criterion, and means for communicating, if the quality is at or above the criterion, between said one base station and said radio telecommunication apparatus only a third signal in a fourth slot, said fourth slot being in a third frame and having a slot number the same as the first slot number.

7. The radio telecommunication system of claim 5 wherein each signal quality of at least one of the first received and, second communicated signals is a bit error rate generated by dividing a number of error corrected bits of the received signal by a number of error correction coded bits of the received signal.

8. The radio telecommunication system of claim 5 wherein each signal quality of at least one of the first received and second communicated signals is an electric field intensity of one of the signals.

9. A radio telecommunication system having radio channels, each radio channel including a plurality of frames, each frame including a plurality of slots, each slot being arranged sequentially in time and being designated by a corresponding slot number according to a location of said each slot in each of said plurality of frames, said plurality of frames and said slots being generated by time division, the system encompasses a plurality of areas each having a base station, each of which communicates a first signal between a radio telecommunication apparatus and one of said base stations, said first signal being in a first slot in a first frame, said first slot having a first slot number, said first slot number being predetermined, the system comprising:

first receiving means for receiving the first signal in said first slot;

first checking means responsive to the first receiving means for checking a signal quality of the first received signal;

comparing means responsive to the first checking means for comparing the signal quality to a criterion;

designating means responsive to the comparing means for designating a plurality of second slots in a second frame if the signal quality is less than the criterion;

sending means responsive to the designating means for sending a second signal including information in a third slot in said second frame, said third slot having a slot number equal to the first slot number and for sending each of third signals in each of said second slots in said second frame, each of third signals including the information;

second receiving means for receiving the second signal and the third signals;

second checking means responsive to the second receiving means for checking each signal quality of the second received signal and the third received signals; and adopting means responsive to the second checking means for adopting one of the second received signal and the third received signals if the signal quality of one is higher than the signal quality of the others.

10. The radio telecommunication system of claim 9, further comprising means, responsive to the second checking means, for comparing the signal quality of the second received signal to the criterion, and means for communicating between one of said base stations and said telecommunication only a fourth signal in a fourth slot, said fourth slot being in a third frame and having a slot number the same as the predetermined first slot number.

11. The radio telecommunication system of claim 9, wherein each signal quality of at least one of the first, second and third received signals is a bit error rate generated by dividing a number of error corrected bits of the received signal by a number of error correction coded bits of the received signal.

12. The radio telecommunication system of claim 9, wherein each signal quality of at least one of the first, second and third received signals is an electric field intensity of one of the first, second and third received signals.

13. A radio telecommunication apparatus for use in a radio telecommunication system having radio channels, each radio channel including a plurality of frames, each frame including a plurality of slots, each slot being arranged sequentially in time and being designated by a corresponding slot number according to a location of said each slot in each of said plurality of frames, said plurality of frames and said slots being generated by time division, wherein the system encompasses a plurality of areas each having a base station, each of which communicates a first signal with the apparatus in a first slot, the first slot being in a first frame and having a predetermined first slot number, the apparatus comprising:

first receiving means for receiving the first signal;

checking means responsive to the first receiving means for checking a signal quality of the first received signal;

comparing means responsive to the checking means for comparing the signal quality to a criterion;

second receiving means for receiving a designating signal designating a second slot in a second frame if the signal quality is less than the criterion, said second slot having a second slot number; and communicating means responsive to the designating signal for communicating a second signal including information in a third slot in said second frame and said third slot having a slot number the same as the predetermined slot number, said communicating means also for communicating a third signal including the information in the second slot between said one of said base stations and said apparatus.

14. The radio telecommunication apparatus of claim 13, further comprising means, responsive to the communicating means, for comparing the signal quality of the second communicated signal to the criterion, and means for communicating, if the quality is at or above the criterion, between said one base station and said radio telecommunication apparatus only a third signal in a fourth slot said fourth slot being in a third frame and having a slot number the same as the predetermined first slot number.

15. The radio telecommunication apparatus of claim 13, wherein each signal quality of at least one of the first received and second communicated signals is a bit error rate generated by dividing a number of error corrected bits of the received signal by a number of error correction coded bits of the received signal.

16. The radio telecommunication apparatus of claim 13, wherein each signal quality of at least one of the first received and second communicated signals is an electric field intensity of one of the signals.

17. A radio telecommunication base station communicating with a radio telecommunication apparatus for use in a radio telecommunication system having radio channels, each radio channel including a plurality of frames, each frame including a plurality of slots, each slot being arranged sequentially in time and being designated by a corresponding slot number according to a location of said each slot in each of said plurality of frames, said plurality of frames and said slots being generated by time division, wherein each base station communicates a first signal with the apparatus in a predetermined first slot, said first slot being in a first frame and having a first slot number, the base station comprising:

receiving means for receiving the first signal in said first slot;

checking means responsive to the receiving means for checking a signal quality of the first received signal;

comparing means responsive to the checking means for comparing the signal quality to a criterion;

designating means responsive to the comparing means for designating a second slot in a second frame if the signal quality is less than the criterion, said second slot having a second slot number; and communicating means responsive to the designating means for communicating between said base station and said apparatus a second signal including information in a third slot, said third slot being in said second frame and having a slot number the same as said first slot number and also communicating a third signal including the information in said second slot.

18. A radio telecommunication base station communicating with a radio telecommunication apparatus for use in a radio telecommunication system having radio channels, each radio channel including a plurality of frames, each frame including a plurality of slots, each slot being arranged sequentially in time and being designated by a corresponding slot number according to a location of said each slot in each of said plurality of frames, said plurality of frames and said slots being generated by time division, wherein the base station communicates a first signal with the apparatus in a first slot in a first frame, said first slot having a predetermined first slot number, the base station comprising:

receiving means for receiving an indicating signal indicating that a signal quality of the first signal received by the apparatus is less than a criterion;

designating means responsive to the receiving means for designating a second slot in a second frame if the signal quality is less than the criterion, said second slot having a second slot number; and communicating means responsive to the designating means for communicating with the apparatus a second signal in a third slot in said second frame, said third slot having a slot number equal to said first slot number and also communicating a third signal including the information in said second slot.

19. A method of communicating a signal in a radio communicating system having radio channels, each radio channel including a plurality of frames, each frame including a plurality of slots, each slot being arranged sequentially in time and being designated by a corresponding slot number according to a location of said each slot within each of said plurality of frames, said plurality of frames and said slots being generated by time division, wherein the system,encompasses a plurality of areas each having a base station, each of which communicates with a radio telecommunication apparatus a first signal in a first slot, said first slot being in a first frame and having a predetermined slot number, comprising the steps of:

receiving the first signal in said first slot;

checking a signal quality of the first received signal;

comparing the signal quality to a criterion;

designating a a second slot in a second frame if the signal quality is less than the criterion, said second slot having a second slot number;

communicating between one of said base stations and said radio telecommunication apparatus a second signal including information in a third slot in said second frame, said third slot having a slot number equal to said first slot number, and communicating a third signal including the information in the second slot;

receiving the second signal and the third signal;

checking each signal quality of the received second signal and the received third signal; and adopting one of the second and the third received signals if the signal quality of the one is higher than the signal quality of the other.

20. The method of claim 19 further comprising the steps of comparing the signal quality of the second received signal to the criterion and communicating between the one of said base stations and said radio telecommunication apparatus only a fourth signal including the information in a fourth slot in a third frame if the signal quality is at or above the criterion, said fourth slot having a slot number equal to said first slot number.

21. A method of communicating a signal in a radio communicating system having radio channels, each radio channel including a plurality of frames, each frame including a plurality of slots, each slot being arranged sequentially in time and being designated by a corresponding slot number according to a location of each said slot within each of said plurality of frames, said plurality of frames and said slots being generated by time division, wherein the system encompasses a plurality of areas each having a base station, each of which sends to a radio telecommunication apparatus a first signal in a first slot, said first slot being in a first frame and having a predetermined first slot number, comprising the steps of:

receiving the first signal;

checking a signal quality of the first received signal;

comparing the signal quality to a criterion;

designating at least a second slot in a second frame if the signal quality is less than the criterion, said second slot having a second slot number; and communicating between said radio telecommunication apparatus and one of said base stations a second signal including information in a third slot in said second frame, said third slot having a slot number equal to said first slot number and also communicating a third signal including the information in said second slot.

22. The method of claims 21 further comprising the steps of comparing the signal quality of the second communicated signal to the criterion and sending only a third signal in a fourth slot if the signal quality is at or above the criterion, said fourth slot being in a third frame and having the same slot number as the first slot.

23. A method of communicating a signal in a radio communicating system having radio channels, each radio channel including a plurality of frames, each frame including a plurality of slots, each slot being arranged sequentially in time and being designated by a corresponding slot number according to a location of said each slot in each of said plurality of frames, said plurality of frames and said slots being generated by time division, wherein the system encompasses a plurality of areas each having a base station, each of which sends to a radio telecommunication apparatus a first signal in a first slot, said first slot being in a first frame and having a predetermined first slot number, comprising the steps of:

receiving the first signal;

checking a signal quality of the first received signal;

comparing the signal quality to a criterion;

designating a plurality of second slots if one signal quality is less than the criterion, said second slots being in a second frame;

sending between one of said base stations and said radio telecommunication apparatus a second signal including information in a third slot in said second frame, and for sending each of the third signals in each of the second slots, each of the third signals including the information;

receiving the second signal and the third signals;

checking the signal quality of each of the second received signal and the third received signals; and adopting one of the second received and third received signals if the signal quality of one is higher than the signal quality of the others.

24. The method of claim 23 further comprising the steps of comparing the signal quality of the second communicated signal to the criterion and communicating between the one of said base stations and said radio telephone apparatus only a third signal including the information contained in said first slot if the signal quality is at or above the criterion, said third signal being communicated in a fourth slot, said fourth slot being in a third frame and having a slot number equal to the first slot number.

25. A radio communication system having radio channels, each radio channel including a plurality of slots generated by time division, wherein the system encompasses a plurality of areas having a corresponding plurality of base stations, each of which communicates a first signal in a predetermined one of the slots with a radio telecommunication apparatus; said at least one of said telecommunication apparatus and said base stations including:
   receiving means for receiving the first signal;
   checking means responsive to the first receiving means for checking a signal quality of the first received signal; and
   comparing means responsive to the first checking means for comparing the signal quality to a criterion;

said one of said plurality of base stations including:
   designation means responsive to the comparing means in said base station for designating a non-used one of the slots if the signal quality is less than the criterion;
said at least one of said telecommunication apparatus and said base stations further including:
   sending means responsive to the designation means for sending a second signal including information in the predetermined slot and for sending a third signal including the information in the designated slot;
   said receiving means operating also to receive the second signal and the third signal, and said checking means also being responsive to the receiving means for checking each signal quality of the second received signal and the third received signal,
   adopting means responsive to the checking means for adopting one of the second received signal and the third received signal if the signal quality of one is higher than the signal quality of the other.

* * * * *